US011513921B1

(12) United States Patent
Yadav et al.

(10) Patent No.: US 11,513,921 B1
(45) Date of Patent: Nov. 29, 2022

(54) LEVERAGING FILE-BASED BACKUPS TO FACILITATE BARE-METAL AND SYSTEM-STATE RECOVERY OPERATIONS

(71) Applicant: EMC IP Holding Company LLC, Hopkinton, MA (US)

(72) Inventors: Sunil Yadav, Bangalore (IN); Shelesh Chopra, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/386,334

(22) Filed: Jul. 27, 2021

(30) Foreign Application Priority Data

Jun. 12, 2021 (IN) .............................. 202141026225

(51) Int. Cl.
*G06F 11/00* (2006.01)
*G06F 11/14* (2006.01)
*G06F 9/455* (2018.01)

(52) U.S. Cl.
CPC ...... *G06F 11/1469* (2013.01); *G06F 9/45541* (2013.01); *G06F 11/1435* (2013.01); *G06F 11/1451* (2013.01); *G06F 11/1464* (2013.01)

(58) Field of Classification Search
CPC ............. G06F 11/1435; G06F 11/1451; G06F 11/1464; G06F 11/1469; G06F 9/45541
See application file for complete search history.

(56) References Cited

U.S. PATENT DOCUMENTS

| 7,418,619 | B1* | 8/2008 | Uhlmann | G06F 11/1469 |
| | | | | 714/E11.122 |
| 7,716,185 | B2* | 5/2010 | Thompson | G06F 11/1464 |
| | | | | 714/15 |
| 9,904,482 | B1* | 2/2018 | Chakraborty | G06F 3/0641 |
| 2004/0236916 | A1* | 11/2004 | Berkowitz | G06F 11/1451 |
| | | | | 711/147 |
| 2015/0212893 | A1* | 7/2015 | Pawar | G06F 11/1456 |
| | | | | 707/649 |

* cited by examiner

*Primary Examiner* — Marc Duncan
(74) *Attorney, Agent, or Firm* — Chamberlain, Hrdlicka, White, Williams & Aughtry

(57) ABSTRACT

A method and system for leveraging file-based backups to facilitate bare-metal recovery (BMR) and/or system-state recovery (SSR) operations. In leading to a BMR operation (which may include, but is not limited to, data protected under a SSR operation), logical groupings of data, each including multiple files and/or directories that span across one or more file-systems, may be written to backup media to comply with data backup, archiving, and/or disaster recovery strategies. Backing up said logical groupings of data relies on block-based backup technologies, which upon requiring a subset of a given logical grouping of data to be restored, makes the restoration process impossible to fulfill since determining which blocks of data belong to which files and/or directories are not tracked. Accordingly, the disclosed method and system propose an intelligent scheme through which file-based backup technology may be employed to enable BMR and/or SSR from any single BMR-compliant backup copy.

20 Claims, 4 Drawing Sheets

LEVERAGING FILE-BASED BACKUPS TO FACILITATE BARE-METAL AND SYSTEM-STATE RECOVERY OPERATIONS

BACKGROUND

In leading to a bare-metal recovery (BMR) operation or a system-state recovery (SSR) operation, logical groupings of data, each including multiple files and/or directories that span across one or more file-systems, may be written to backup media to comply with data backup, archiving, and/or disaster recovery strategies. Backing up said logical groupings of data relies on block-based backup technologies, which upon requiring a subset of a given logical grouping of data to be restored, makes the restoration process impossible to fulfill since determining which blocks of data belong to which files and/or directories are not tracked.

SUMMARY

In general, in one aspect, the invention relates to a method for data restoration. The method includes receiving, from a user, instructions to perform a recovery operation, in response to the instructions, identifying a writer-key table comprising a first plurality of data entries, wherein each data entry of the first plurality of data entries maps a volume shadow copy service (VSS) writer to at least one recovery-pertinent file-system object key, obtaining, from the user, a recovery-pertinent writer selection comprising at least one VSS writer, identifying an object metadata schema comprising a second plurality of data entries, wherein each data entry of the second plurality of data entries maps a recovery-pertinent file-system object key to recovery-pertinent file-system object metadata, for each given VSS writer specified in the recovery-pertinent writer selection, performing a first lookup on the writer-key table using the given VSS writer to obtain the at least one recovery-pertinent file-system object key, performing a second lookup on the object metadata schema using the at least one recovery-pertinent file-system object key to obtain the recovery-pertinent file-system object metadata for at least one recovery-pertinent file-system object, and restoring, from a backup target and onto a volume host, the at least one recovery-pertinent file-system object based on the recovery-pertinent file-system object metadata.

In general, in one aspect, the invention relates to a non-transitory computer readable medium (CRM). The non-transitory CRM includes computer readable program code, which when executed by a computer processor, enables the computer processor to perform a method for data restoration. The method includes receiving, from a user, instructions to perform a recovery operation, in response to the instructions, identifying a writer-key table comprising a first plurality of data entries, wherein each data entry of the first plurality of data entries maps a volume shadow copy service (VSS) writer to at least one recovery-pertinent file-system object key, obtaining, from the user, a recovery-pertinent writer selection comprising at least one VSS writer, identifying an object metadata schema comprising a second plurality of data entries, wherein each data entry of the second plurality of data entries maps a recovery-pertinent file-system object key to recovery-pertinent file-system object metadata, for each given VSS writer specified in the recovery-pertinent writer selection, performing a first lookup on the writer-key table using the given VSS writer to obtain the at least one recovery-pertinent file-system object key, performing a second lookup on the object metadata schema using the at least one recovery-pertinent file-system object key to obtain the recovery-pertinent file-system object metadata for at least one recovery-pertinent file-system object, and restoring, from a backup target and onto a volume host, the at least one recovery-pertinent file-system object based on the recovery-pertinent file-system object metadata.

Other aspects of the invention will be apparent from the following description and the appended claims.

DETAILED DESCRIPTION

Figure 1:
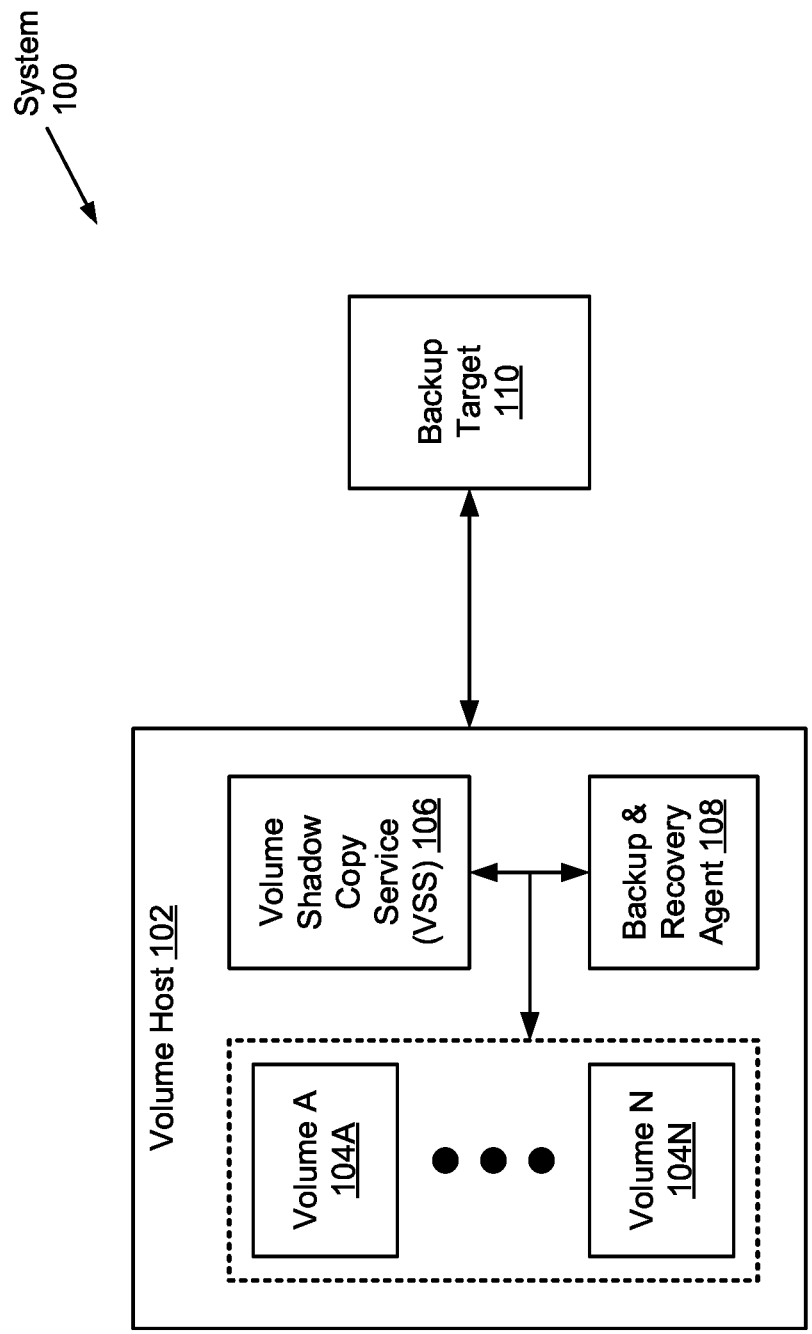
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for leveraging file-based backups to facilitate bare-metal recovery (BMR) and/or system-state recovery (SSR) operations. In leading to a BMR operation (which may include, but is not limited to, data protected under a SSR operation), logical groupings of data, each including multiple files and/or directories that span across one or more file-systems, may be written to backup media to comply with data backup, archiving, and/or disaster recovery strategies. Backing up said logical groupings of data relies on block-based backup technologies, which upon requiring a subset of a given logical grouping of data to be restored, makes the restoration process impossible to fulfill since determining which blocks of data belong to which files and/or directories are not tracked. Accordingly, the disclosed method and system propose an intelligent scheme through which file-based backup technology may be employed to enable BMR and/or SSR from any single BMR-compliant backup copy.

FIG. 1 shows a system in accordance with one or more embodiments of the invention. The system (100) may include an volume host (102) and a backup target (110). Each of these system (100) components is described below.

In one embodiment of the invention, the volume host (102) may represent any physical appliance or computing system designed and configured to receive, generate, process, store, and/or transmit data, as well as to provide an environment in which one or more computer programs may execute thereon. The computer programs may, for example, implement large-scale and complex data processing; or implement one or more services offered locally or over a network. Further, in providing an execution environment for any computer programs installed thereon, the volume host (102) may include and allocate various resources (e.g., computer processors, memory, storage, virtualization, network bandwidth, etc.), as needed, to the computer programs and the tasks (or processes) instantiated thereby. One of ordinary skill will appreciate that the volume host (102) may perform other functionalities without departing from the scope of the invention. Examples of the volume host (102) may include, but are not limited to, a desktop computer, a laptop computer, a server, a mainframe, or any other computing system similar to the exemplary computing system shown in FIG. 4. Moreover, the volume host (102) may include one or more volumes (104A-104N), a volume shadow copy service (VSS) (106), and a backup and recovery agent (108). Each of these volume host (102) subcomponents is described below.

In one embodiment of the invention, a volume (104A-104N) may refer to a database, or any logical container to and from which data (and/or metadata thereof), which has been received by or generated on the volume host (102), may be stored and retrieved, respectively. A volume (104A-104N) may occupy any portion of persistent storage (not shown) available on the volume host (102). Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the VSS (106) may refer to a computer program that may execute on the underlying hardware of the volume host (102), which may be responsible for coordinating the creation of consistent shadow copies (also referred to as VSS snapshots) of the volume(s) (104A-104N) (or any portion(s) thereof) targeted for backup. To that extent, the VSS (106) may include functionality to coordinate with the backup and recovery agent (108) (e.g., a VSS requestor (described below)), any number of VSS writers (not shown) (described below), and any number of VSS providers (not shown) (described below) to create the consistent shadow copies. Metadata produced as a result of consistent shadow copy creation, alongside any created consistent shadow copies, may be provided to the backup and recovery agent (108) in support of embodiments of the invention. One of ordinary skill, however, will appreciate that the VSS (106) may perform other functionalities without departing from the scope of the invention.

In one embodiment of the invention, concerning the creation of consistent shadow copies: (a) a VSS requestor may refer to an entity (e.g., a computer program, a software application, etc.) that submits, to the VSS (106), requests for the creation of the consistent shadow copies; (b) a VSS writer may refer to an entity (e.g., a software application, an operating system, or a sub-component thereof) that stores or writes data onto the volume(s) (104A-104N); and (c) a VSS provider may refer to an entity (e.g., a software application, an operating system, or a sub-component thereof) that manages the volume(s) (104A-104N) and produces the consistent shadow copies. One of ordinary skill will appreciate that a VSS requestor, a VSS writer, and/or a VSS provider may perform other functionalities without departing from the scope of the invention.

In one embodiment of the invention, the backup and recovery agent (108) may refer to a computer program that may execute on the underlying hardware of the volume host (102), which may be responsible for facilitating backup and recovery operations targeting the volume(s) (104A-104N) (or any portion(s) thereof). To that extent, the backup and recovery agent (108) may protect the volume(s) (104A-104N) against data loss (i.e., backup the targeted file-system object(s) by performing the method outlined and described through FIG. 2, below); and restore the volume(s) (104A-104N) (or any portion(s) thereof) following such data loss (i.e., recover the targeted file-system object(s) by performing the method outlined and described through FIG. 3, below). Further, one of ordinary skill will appreciate that the backup and recovery agent (108) may perform other functionalities without departing from the scope of the invention.

In one embodiment of the invention, the backup target (110) may represent any data backup, archiving, and/or disaster recovery storage system. The backup target (110) may be implemented using one or more storage servers (or computing systems similar to the exemplary computing system shown in FIG. 4) (not shown)—each of which may house one or many storage devices for storing data. Further, the backup target (110) may, at least in part, include persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the above-mentioned system (100) components (or subcomponents thereof) may communicate with one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1 shows a configuration of components, other system (100) configurations may be used without departing from the scope of the invention. For example, the system (100) may include more than one volume host (not shown) and/or more than one backup target (not shown).

Figure 2:
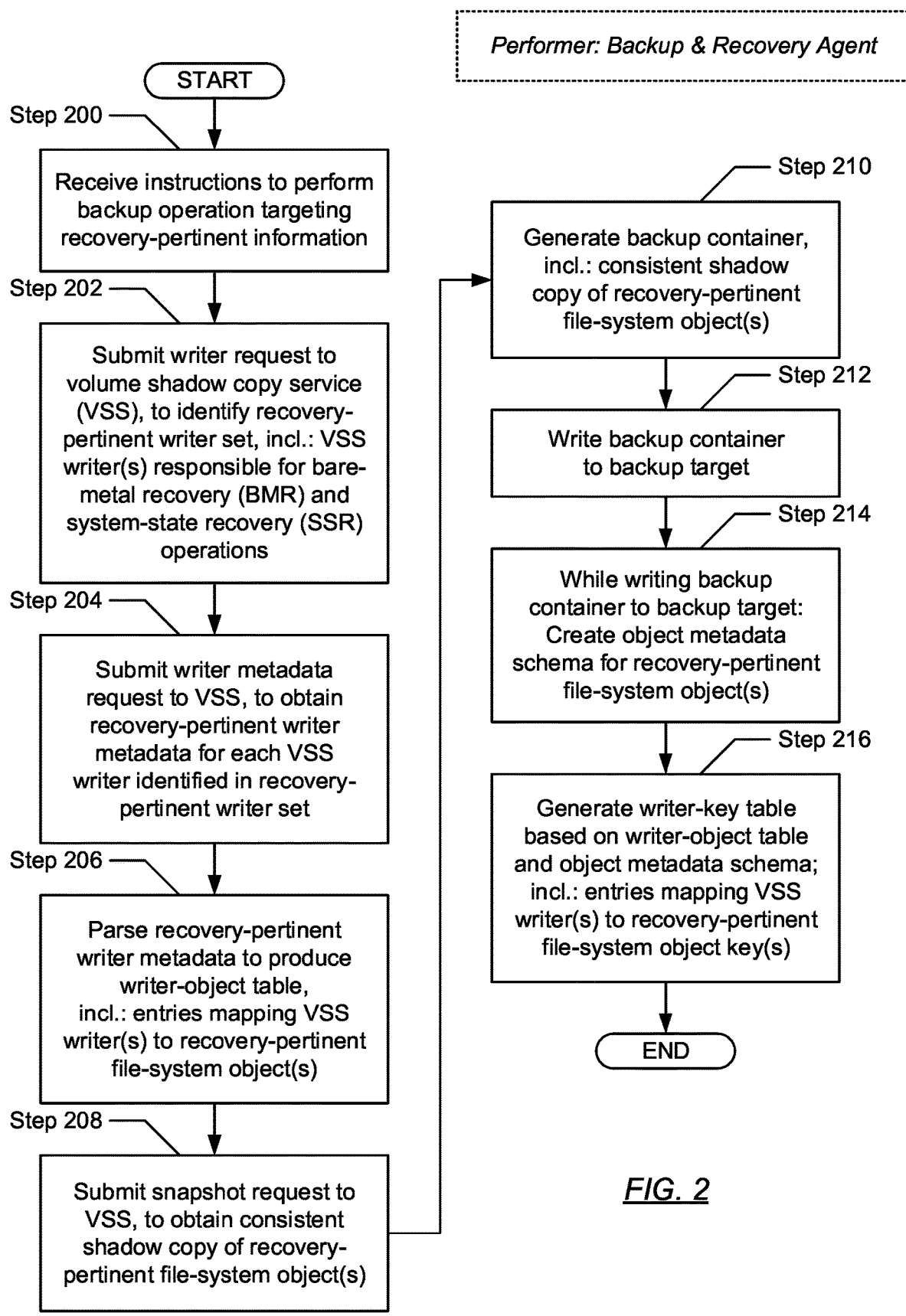
FIG. 2 shows a flowchart describing a method for performing data backup operations in accordance with one or more embodiments of the invention.

FIG. 2 shows a flowchart describing a method for performing data backup operations in accordance with one or more embodiments of the invention. The various steps outlined below may be performed by the backup and recovery agent on an volume host (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, instructions to perform a backup operation is received. In one embodiment of the invention, the instructions may coincide with an on-demand request, or a scheduled periodic request, to perform the backup operation. Further, the backup operation may target recovery-pertinent information, which may entail one or more file-system objects (i.e., file(s) and/or directory(directories)) pertinent to bare-metal recovery (BMR) and/or system-state recovery (SSR) operations.

In one embodiment of the invention, a BMR operation may entail the restoration of a whole computing system, including operating system state, any or all software applications, and application data (stored across the volume(s)). Collectively, the entirety of the aforementioned information may be backed-up on a backup target in a form that enables the information to be restored onto any bare-metal computing system (i.e., any computing system without any software application(s) and/or an operating system installed). A SSR operation, on the other hand, may entail the restoration of critical operating system components for when an operating system on a computing system is lost or damaged. These critical operating system components may include, but are not limited to, operating system boot files, the component object model (COM+) class registration database, system registries, the active directory, and the system volume.

In Step 202, following the instructions (received in Step 200), a writer request is submitted to the volume shadow copy service (VSS) (described above) (see e.g., FIG. 1). In one embodiment of the invention, in response to the writer request, a recovery-pertinent writer set may be identified and provided by the VSS. The recovery-pertinent writer set may refer to a list that specifies one or more VSS writers (described above) (see e.g., FIG. 1) whom is/are responsible for the above-mentioned BMR and/or SSR operations on the volume host.

In Step 204, based on the recovery-pertinent writer set (obtained in Step 202), a writer metadata request is subsequently submitted to the VSS. In one embodiment of the invention, in response to the writer metadata request, recovery-pertinent writer metadata, for the VSS writer(s) specified in the recovery-pertinent writer set, may be identified and provided by the VSS. Examples of recovery-pertinent writer metadata, for a given VSS writer, may include, but are not limited to: writer identification information (e.g., a writer name, a writer class ID, etc.) associated with the given VSS writer; writer-level specifications such as a restore method specification (i.e., indicating a preferred file restoration method for all file-system object(s) managed by the given VSS writer), an exclude file list specification (i.e., indicating any file-system object(s) that is/are not to be included in a backup set), and an alternate location mappings specification (i.e., indicating a location on disk to which the file-system object(s) may be restored should restoration of the file-system object(s) to an original location fails); and component-level information (e.g., component type, component name, component logical path, component selectability for backup/restore, etc.) associated with one or more components (i.e., logical collections of file-system objects, which may be backed-up and restored together) managed by the given VSS writer.

In Step 206, the recovery-pertinent writer metadata (obtained in Step 204) is parsed. In one embodiment of the invention, the parsing may result in the production of a writer-object table. The writer-object table may refer to a collection of data entries, where each data entry maps a VSS writer to one or more recovery-pertinent file-system objects (i.e., file(s) and/or directory(directories)). The recovery-pertinent file-system object(s), mapped to a given VSS writer, may encompass information the given VSS writer created, modified, or otherwise accessed while fulfilling their respective BMR and/or SSR related responsibilities.

In Step 208, a snapshot request is submitted to the VSS. In one embodiment of the invention, in response to the snapshot request, the VSS may return location information for a consistent shadow copy that is successfully created. The consistent shadow copy may encompass a point-in-time snapshot of the recovery-pertinent file-system object(s) specified in the writer-object table (produced in Step 206). Further, the consistent shadow copy may be created using any existing procedure—a non-limiting example of which is outlined below.

Example Consistent Shadow Copy Creation Procedure
1) VSS requestor (e.g., backup and recovery agent) requests VSS to create consistent shadow copy of target volume or target data set
2) VSS notifies VSS writer(s) to prepare their data for making the consistent shadow copy; each VSS writer creates a description of the backup components and defines a restoration method; each VSS writer prepares their data by completing any open input-output (IO) transactions, rolling transaction logs, and flushing caches
3) VSS directs VSS writer(s) to temporarily freeze IO write requests to their respective volume(s) or data set(s) for the duration of the creation of the consistent shadow copy
4) VSS flushes the file-system buffer and then freezes the file-system, thereby ensuring that the file-system metadata is copied and that the target volume or target data set is copied in a consistent order
5) VSS notifies VSS provider(s) to create and maintain the consistent shadow copy of the target volume or target data set
6) Once the consistent shadow copy is successfully created, VSS unfreezes the file-system and instructs the VSS writer(s) to unfreeze IO write requests to their respective volume(s) or data set(s)
7) VSS subsequently provides location information (i.e., where the consistent shadow copy is being maintained) to the VSS requestor In Step 210, a backup container is generated. In one embodiment of the invention, the backup container may refer to a container format (or metafile) configured to enable multiple data streams (as well as metadata detailing the data streams) to be embedded into a single file. Specifically, the backup container may include the consistent shadow copy of the recovery-pertinent file-system object(s) (obtained in Step 208). By way of a non-limiting example, the backup container may employ a common data stream format (CDSF) configuration.

In Step 212, the backup container (generated in Step 210) is written to a backup target (described above) (see e.g., FIG. 1). While, or following, the writing of the backup container to the backup target, in Step 214, an object metadata schema is created. In one embodiment of the invention, the object metadata schema may refer to a collection of data entries, where each data entry maps a recovery-pertinent file-system object key for a given recovery-pertinent file-system object (specified in the writer-object table produced in Step 206) to recovery-pertinent file-system object metadata descriptive of the given recovery-pertinent file-system object. By way of a non-limiting example, the object metadata schema may employ a SQLite relational database file format.

In one embodiment of the invention, the above-mentioned recovery-pertinent file-system object metadata, for a given recovery-pertinent file-system object, may include, but is not limited to: a system generated identifier (ID) assigned to the given recovery-pertinent file-system object; a parent ID of a parent file-system object (if any) for the given recovery-pertinent file-system object; a user-specified name labeling the given recovery-pertinent file-system object; a Boolean value (e.g., 1 or 0, true or false) reflecting whether the given recovery-pertinent file-system object is a directory; a storage size (e.g., in bytes) of the given recovery-pertinent file-system object; a header size (e.g., in bytes) of header information associated with the given recovery-pertinent file-system object; a footer size (e.g., in bytes) of footer information associated with the given recovery-pertinent file-system object; a backup container record index assigned to the given recovery-pertinent file-system object; a backup container offset for the given recovery-pertinent file-system object, which may indicate a location from a start/top of the backup container where data for the given recovery-pertinent file-system object is stored; and a checksum generated for the given recovery-pertinent file-system object.

Further, in one embodiment of the invention, the above-mentioned recovery-pertinent file-system object key, for a given recovery-pertinent file-system object, may refer to globally unique information relating to the given recovery-pertinent file-system object. The recovery-pertinent file-system object key may serve as a connection (or relational) bridge between the object metadata schema and a writer-key table (described below), which data recovery (see e.g., FIG. 3) in accordance with one or more embodiments of the invention is relied upon. By way of a non-limiting example, the recovery-pertinent file-system object key may reference the backup container record index assigned to the given recovery-pertinent file-system object.

In Step 216, a writer-key table is generated. In one embodiment of the invention, the writer-key table may refer to a collection of data entries, where each data entry maps a VSS writer to one or more recovery-pertinent file-system object keys (described above). The writer-key table may be created, rather than expanding the object metadata schema to include a VSS writer in each of its data entries, in order to curtail performance reductions that may be brought about by increasing the size of the object metadata schema. Further, the writer-key table may be generated from portion(s) of the writer-object table (produced in Step 206) and the object metadata schema (created in Step 214).

Figure 3:
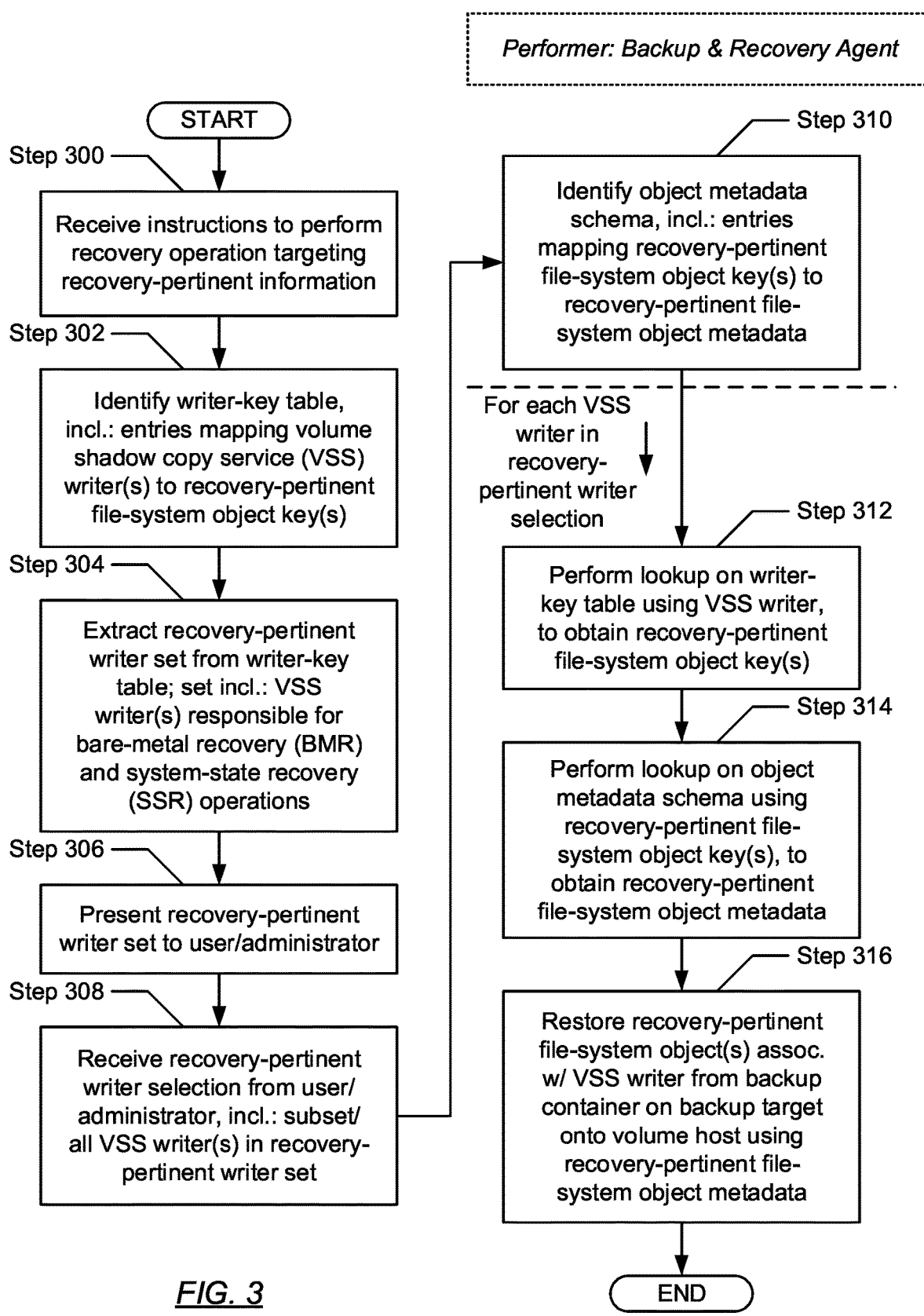
FIG. 3 shows a flowchart describing a method for performing data recovery operations in accordance with one or more embodiments of the invention.

FIG. 3 shows a flowchart describing a method for performing data recovery operations in accordance with one or more embodiments of the invention. The various steps outlined below may be performed by the backup and recovery agent on an volume host (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, instructions to perform a recovery operation are received. In one embodiment of the invention, the instructions may coincide with an on-demand request to perform the recovery operation following a failover event. Further, the recovery operation may target recovery-pertinent information, which may entail one or more file-system objects (i.e., file(s) and/or directory(directories)) pertinent to bare-metal recovery (BMR) and/or system-state recovery (SSR) operations (described above) (see e.g., FIG. 2).

In Step 302, following the instructions (received in Step 300), a writer-key table is identified. In one embodiment of the invention, the writer-key table may refer to a collection of data entries, where each data entry maps a volume shadow copy service (VSS) writer to one or more recovery-pertinent file-system object keys. A VSS writer may refer to an entity (e.g., a software application, an operating system, or a sub-component thereof) that stores or writes data onto the volume(s) on the volume host (see e.g., FIG. 1), where the data relates to the fulfillment of any BMR and/or SSR operations. A recovery-pertinent file-system object key may refer to globally unique information relating to a given recovery-pertinent file-system object (i.e., a file or a directory pertinent to the fulfillment of any BMR and/or SSR operations).

In Step 304, from the writer-key table (identified in Step 302), a recovery-pertinent writer set is extracted. In one embodiment of the invention, the recovery-pertinent writer set may refer to a list that specifies the VSS writer(s) whom is/are responsible for the above-mentioned BMR and/or SSR operations on the volume host.

In Step 306, the recovery-pertinent writer set (extracted in Step 304) is presented, via an interface (e.g., a command-line interface, a graphical user interface, etc.), to a user or administrator from which the instructions to perform the recovery operation (had been received in Step 300). Thereafter, in Step 308, a recovery-pertinent writer selection is received from the user/administrator. In one embodiment of the invention, the recovery-pertinent writer selection may specify any subset or all of the VSS writer(s) included in the recovery-pertinent writer set.

In Step 310, an object metadata schema is identified. In one embodiment of the invention, the object metadata schema may refer to a collection of data entries, where each data entry maps a recovery-pertinent file-system object key (described above) for a given recovery-pertinent file-system object to recovery-pertinent file-system object metadata descriptive of the given recovery-pertinent file-system object. Examples of information that may be included in the recovery-pertinent file-system object metadata are listed above (see e.g., FIG. 2), which may include an above-mentioned recovery-pertinent file-system object key for the given recovery-pertinent file-system object.

Hereinafter, the remainder of the outlined method (e.g., Steps 312, 314, and 316) may be performed for each VSS writer specified in the recovery-pertinent writer selection (obtained in Step 308).

In Step 312, a lookup is performed on the writer-key table (identified in Step 302) using the VSS writer. In one embodiment of the invention, the lookup may result in the identification of one or many data entries in the writer-key table, where the data entry (or each data entry) maps the VSS writer to one or more recovery-pertinent file-system object keys.

In Step 314, another lookup is performed on the object metadata schema (identified in Step 310) using the recovery-pertinent file-system object key(s) (obtained in Step 312). In one embodiment of the invention, the lookup may result in the identification of one or more data entries in the object metadata schema, where the data entry (or each data entry) maps a recovery-pertinent file-system object key to recovery-pertinent file-system object metadata descriptive of a recovery-pertinent file-system object.

In Step 316, one or more recovery-pertinent file-system objects is/are restored from a backup container on a backup target onto a volume host (see e.g., FIG. 1). In one embodiment of the invention, the restored recovery-pertinent file-system object(s) may encompass file(s) and/or directory (directories) for which the VSS writer may have been responsible while fulfilling BMR and/or SSR operations. Further, restoration of the recovery-pertinent file-system object(s) may, at least in part, rely on at least a portion of the recovery-pertinent file-system object metadata (obtained in Step 314). By way of an example, the recovery-pertinent file-system object metadata, for a given recovery-pertinent file-system object, may include a backup container offset, which references location information (relative to a start or top of the backup container) where data representative of the given recovery-pertinent file-system object may be stored and, accordingly, retrieved from for restoration.

Figure 4:
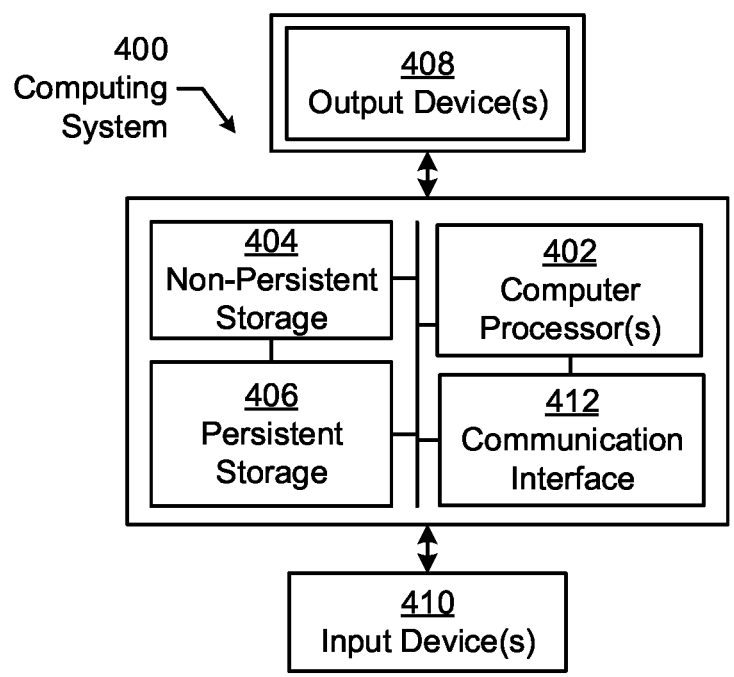
FIG. 4 shows an exemplary computing system in accordance with one or more embodiments of the invention.

FIG. 4 shows an exemplary computing system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for data restoration, comprising:
   receiving, from a user, instructions to perform a recovery operation;
   in response to the instructions:
   identifying a writer-key table comprising a first plurality of data entries, wherein each data entry of the first plurality of data entries maps a volume shadow copy service (VSS) writer to at least one recovery-pertinent file-system object key;
   obtaining, from the user, a recovery-pertinent writer selection comprising at least one VSS writer;
   identifying an object metadata schema comprising a second plurality of data entries, wherein each data entry of the second plurality of data entries maps a recovery-pertinent file-system object key to recovery-pertinent file-system object metadata;
   for each given VSS writer specified in the recovery-pertinent writer selection:
   performing a first lookup on the writer-key table using the given VSS writer to obtain the at least one recovery-pertinent file-system object key;
   performing a second lookup on the object metadata schema using the at least one recovery-pertinent file-system object key to obtain the recovery-pertinent file-system object metadata for at least one recovery-pertinent file-system object; and
   restoring, from a backup target and onto a volume host, the at least one recovery-pertinent file-system object based on the recovery-pertinent file-system object metadata.

2. The method of claim 1, wherein the at least one recovery-pertinent file-system object key comprises at least one backup container record index assigned to the at least one recovery-pertinent file-system object, respectively.

3. The method of claim 2, wherein the at least one backup container record index serves to index the at least one recovery-pertinent file-system object, respectively, in a backup container stored on the backup target.

4. The method of claim 3, wherein the backup container is formatted in a common data stream format (CDSF).

5. The method of claim 3, wherein the recovery-pertinent file-system object metadata for the at least one recovery-pertinent file-system object comprises a backup container offset indicating where in the backup container that data representative of the at least one recovery-pertinent file-system object is located.

6. The method of claim 1, wherein the at least one recovery-pertinent file-system object had been a responsibility of the given VSS writer while fulfilling at least one selected from a group of recovery operations consisting of a bare-metal recovery (BMR) operation and a system-state recovery (SSR) operation.

7. The method of claim 1, further comprising:
prior to receiving the instructions to perform the recovery operation:
submitting, to a VSS, a snapshot request to obtain a consistent shadow copy of the at least one recovery-pertinent file system object for each VSS writer specified in a recovery-pertinent writer set;
generating a backup container comprising the consistent shadow copy; and
writing the backup container to the backup target.

8. The method of claim 7, further comprising:
prior to submitting the snapshot request:
submitting, to the VSS, a writer request to identify the recovery-pertinent writer set comprising a superset of VSS writers, wherein the superset of VSS writers comprises the recovery-pertinent writer selection;
submitting, to the VSS, a writer metadata request to obtain recovery-pertinent writer metadata for each VSS writer specified in the recovery-pertinent writer set; and
parsing the recovery-pertinent writer metadata to produce a writer-object table comprising a third plurality of data entries, wherein each data entry of the third plurality of data entries maps a VSS writer to at least one recovery-pertinent file-system object.

9. The method of claim 8, further comprising:
while writing the backup container to the backup target:
creating the object metadata schema,
wherein creation of the object metadata schema comprises:
for each recovery-pertinent file-system object specified in the writer-object table:
generating recovery-pertinent file-system object metadata following a write of a portion of the backup container to the backup target,
wherein the portion of the backup container comprises data representative of the recovery-pertinent file-system object;
identifying, from the recovery-pertinent file-system object metadata, the recovery-pertinent file-system object key for the recovery-pertinent file-system object; and
adding, in the object metadata schema, a data entry comprising the recovery-pertinent file-system object key and the recovery-pertinent file-system object metadata for the recovery-pertinent file-system object.

10. The method of claim 9, further comprising:
following the creation of the object metadata schema:
generating the writer-key table,
wherein generation of the writer-key table comprises:
for each VSS writer specified in recovery-pertinent writer set:
performing a third lookup on the writer-object table using the VSS writer to identify the at least one recovery-pertinent file-system object;
identifying, from the object metadata schema, at least one recovery-pertinent file-system object key for the at least one recovery-pertinent file-system object, respectively; and
adding, in the writer-key table, a data entry comprising the VSS writer and the at least one recovery-pertinent file-system object key.

11. A non-transitory computer readable medium (CRM) comprising computer readable program code, which when executed by a computer processor, enables the computer processor to perform a method for data restoration, the method comprising:
receiving, from a user, instructions to perform a recovery operation;
in response to the instructions:
identifying a writer-key table comprising a first plurality of data entries, wherein each data entry of the first plurality of data entries maps a volume shadow copy service (VSS) writer to at least one recovery-pertinent file-system object key;
obtaining, from the user, a recovery-pertinent writer selection comprising at least one VSS writer;
identifying an object metadata schema comprising a second plurality of data entries, wherein each data entry of the second plurality of data entries maps a recovery-pertinent file-system object key to recovery-pertinent file-system object metadata;
for each given VSS writer specified in the recovery-pertinent writer selection:
performing a first lookup on the writer-key table using the given VSS writer to obtain the at least one recovery-pertinent file-system object key;
performing a second lookup on the object metadata schema using the at least one recovery-pertinent file-system object key to obtain the recovery-pertinent file-system object metadata for at least one recovery-pertinent file-system object; and
restoring, from a backup target and onto a volume host, the at least one recovery-pertinent file-system object based on the recovery-pertinent file-system object metadata.

12. The non-transitory CRM of claim 11, wherein the at least one recovery-pertinent file-system object key comprises at least one backup container record index assigned to the at least one recovery-pertinent file-system object, respectively.

13. The non-transitory CRM of claim 12, wherein the at least one backup container record index serves to index the at least one recovery-pertinent file-system object, respectively, in a backup container stored on the backup target.

14. The non-transitory CRM of claim 13, wherein the backup container is formatted in a common data stream format (CDSF).

15. The non-transitory CRM of claim 13, wherein the recovery-pertinent file-system object metadata for the at least one recovery-pertinent file-system object comprises a backup container offset indicating where in the backup container that data representative of the at least one recovery-pertinent file-system object is located.

16. The non-transitory CRM of claim 11, wherein the at least one recovery-pertinent file-system object had been a responsibility of the given VSS writer while fulfilling at least one selected from a group of recovery operations consisting of a bare-metal recovery (BMR) operation and a system-state recovery (SSR) operation.

17. The non-transitory CRM of claim 11, the method further comprising:
prior to receiving the instructions to perform the recovery operation:
submitting, to a VSS, a snapshot request to obtain a consistent shadow copy of the at least one recovery-pertinent file system object for each VSS writer specified in a recovery-pertinent writer set;
generating a backup container comprising the consistent shadow copy; and
writing the backup container to the backup target.

18. The non-transitory CRM of claim 17, the method further comprising:
prior to submitting the snapshot request:
submitting, to the VSS, a writer request to identify the recovery-pertinent writer set comprising a superset of VSS writers, wherein the superset of VSS writers comprises the recovery-pertinent writer selection;
submitting, to the VSS, a writer metadata request to obtain recovery-pertinent writer metadata for each VSS writer specified in the recovery-pertinent writer set; and
parsing the recovery-pertinent writer metadata to produce a writer-object table comprising a third plurality of data entries, wherein each data entry of the third plurality of data entries maps a VSS writer to at least one recovery-pertinent file-system object.

19. The non-transitory CRM of claim 18, the method further comprising:
while writing the backup container to the backup target:
creating the object metadata schema,
wherein creation of the object metadata schema comprises:
for each recovery-pertinent file-system object specified in the writer-object table:
generating recovery-pertinent file-system object metadata following a write of a portion of the backup container to the backup target,
wherein the portion of the backup container comprises data representative of the recovery-pertinent file-system object;
identifying, from the recovery-pertinent file-system object metadata, the recovery-pertinent file-system object key for the recovery-pertinent file-system object; and
adding, in the object metadata schema, a data entry comprising the recovery-pertinent file-system object key and the recovery-pertinent file-system object metadata for the recovery-pertinent file-system object.

20. The non-transitory CRM of claim 19, the method further comprising:
following the creation of the object metadata schema:
generating the writer-key table,
wherein generation of the writer-key table comprises:
for each VSS writer specified in recovery-pertinent writer set:
performing a third lookup on the writer-object table using the VSS writer to identify the at least one recovery-pertinent file-system object;
identifying, from the object metadata schema, at least one recovery-pertinent file-system object key for the at least one recovery-pertinent file-system object, respectively; and
adding, in the writer-key table, a data entry comprising the VSS writer and the at least one recovery-pertinent file-system object key.

\* \* \* \* \*